(12) United States Patent
Dicke

(10) Patent No.: US 8,792,916 B2
(45) Date of Patent: Jul. 29, 2014

(54) DYNAMIC PRIORITIZATION OF LABEL DOWNLOADS

(75) Inventor: Ronald Anthony Dicke, Ottawa (CA)

(73) Assignee: BlackBerry Limited, Waterloo (CA)

( * ) Notice: Subject to any disclaimer, the term of this patent is extended or adjusted under 35 U.S.C. 154(b) by 1065 days.

(21) Appl. No.: 12/013,564

(22) Filed: Jan. 14, 2008

(65) Prior Publication Data

US 2009/0181650 A1 Jul. 16, 2009

(51) Int. Cl.
*H04W 24/00* (2009.01)
(52) U.S. Cl.
USPC .......................................... 455/457; 370/338
(58) Field of Classification Search
USPC ............. 455/457; 340/995.1, 995.19, 995.14, 340/995.15; 709/223
See application file for complete search history.

(56) References Cited

U.S. PATENT DOCUMENTS

| | | | |
|---|---|---|---|
| 4,914,605 A | 4/1990 | Loughmiller, Jr. et al. | |
| 5,684,940 A | 11/1997 | Freeman et al. | |
| 5,991,690 A | 11/1999 | Murphy | |
| 6,075,467 A * | 6/2000 | Ninagawa | 340/995.14 |
| 6,154,219 A | 11/2000 | Wiley et al. | |
| 6,321,158 B1 * | 11/2001 | DeLorme et al. | 701/201 |
| 6,324,467 B1 * | 11/2001 | Machii et al. | 701/200 |
| 6,553,308 B1 | 4/2003 | Uhlmann et al. | |
| 7,783,530 B2 * | 8/2010 | Slemmer et al. | 705/28 |
| 2002/0099844 A1 * | 7/2002 | Baumann et al. | 709/232 |
| 2004/0027258 A1 * | 2/2004 | Pechatnikov et al. | 340/995.1 |
| 2004/0252137 A1 | 12/2004 | Gelber | |
| 2006/0074553 A1 * | 4/2006 | Foo et al. | 701/212 |
| 2007/0233840 A1 * | 10/2007 | Alstrup et al. | 709/223 |

FOREIGN PATENT DOCUMENTS

| | | |
|---|---|---|
| EP | 1 643 214 A | 4/2006 |
| EP | 1 840 516 A | 10/2007 |
| JP | 10143068 A | 5/1998 |
| JP | 2007003826 A | 1/2007 |

OTHER PUBLICATIONS

European Search Report for EP Application No. 08150233.8 mailed Aug. 1, 2008.

* cited by examiner

*Primary Examiner* — Marcos Batista
(74) *Attorney, Agent, or Firm* — Gowling Lafleur Henderson LLP; Matthew Roy

(57) ABSTRACT

Map labels are dynamically downloaded to a wireless communication device for efficiently labelling a map displayed on the device. A method of dynamically downloading map labels to a wireless communications device includes steps of determining a size of label data for an area of interest and dynamically downloading the label data for the area of interest based on the size of the label data. Optionally, map labels can be dynamically downloaded based on a label prioritization scheme that takes into account the current position of the device. Optionally, the size of the label data can be determined from a map data index.

20 Claims, 9 Drawing Sheets

DYNAMIC PRIORITIZATION OF LABEL DOWNLOADS

CROSS-REFERENCE TO RELATED APPLICATIONS

This is the first application filed for the present technology.

TECHNICAL FIELD

The present disclosure relates generally to wireless communications devices and, in particular, to techniques for downloading and displaying maps on wireless communications devices.

BACKGROUND

Wireless communications devices such as the BlackBerry® by Research in Motion Limited provide a variety of useful functions, such as voice communication, e-mail and Web browsing. Of growing popularity are mapping applications that take advantage of the device's wireless link and Web capabilities to download and render maps on the device. When coupled with a GPS receiver, either embedded as a GPS chipset or externally (e.g. Bluetooth™ connected), these mapping applications can be used for navigation and other location-based services (LBS). Depending on the map server, maps can be downloaded in vector format or bitmap format. While all map data required to fully render detailed maps onscreen can be easily downloaded to desktop computers with broadband connections, the same is not true when downloading maps to a wireless communications device (because of the limited bandwidth of the wireless link). Another consideration is the limited onboard processing capability of the wireless communications device which limits the use of computationally intensive labelling algorithms on the client device. These, and other considerations, are to be kept in mind when improving and refining mapping technologies for wireless communications devices.

BRIEF DESCRIPTION OF THE DRAWINGS

Further features and advantages of the present technology will become apparent from the following detailed description, taken in combination with the appended drawings, in which.

It will be noted that throughout the appended drawings, like features are identified by like reference numerals.

DETAILED DESCRIPTION

Figure 1:
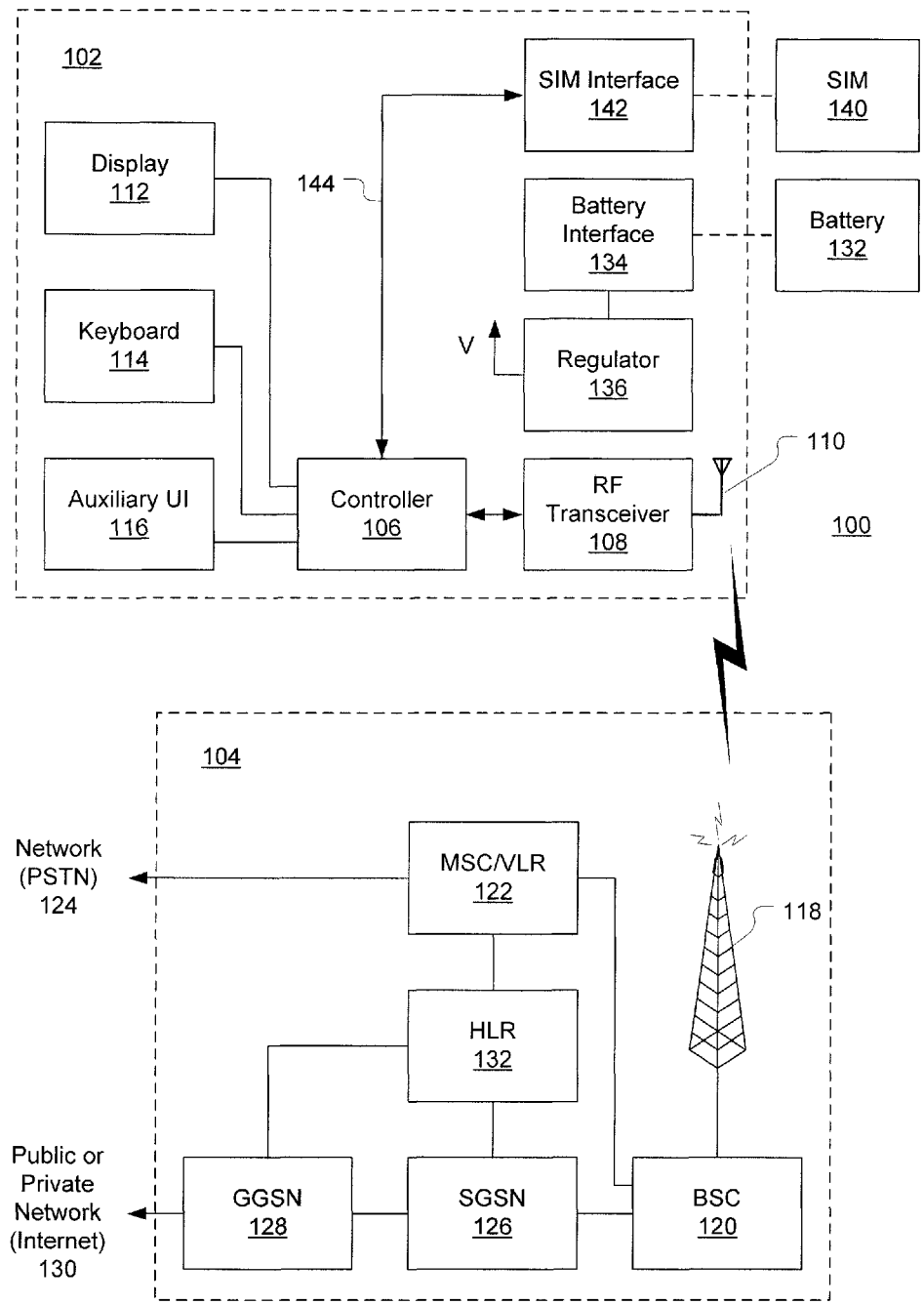
FIG. 1 is a block diagram schematically illustrating pertinent components of an exemplary wireless communications device and of an exemplary wireless communications network on which the present technology can be implemented.

The present technology addresses a technical problem identified by the applicant pertaining to the manner in which map labels, especially for maps in vector format, are currently downloaded and displayed on wireless communications devices. Applicant has recognized that, when displaying a map on a small screen of a wireless device, it is often not feasible to label every single street being displayed, particularly at higher zoom levels. Furthermore, street label data is quite large, especially relative to the size of the vector map data needed to display the actual streets and roadways. Accordingly, downloading, or even attempting to download, all of the label data available for a given area of interest can thus be highly inefficient since the device may not even be able to display all of the downloaded labels due to available space onscreen (i.e. avoiding onscreen label collisions). Moreover, when the device is moving at high velocity at a high zoom level, the device typically cannot download the labels fast enough to be able to display them onscreen before the area of interest has shifted, requiring a fresh download of map data.

Therefore, applicant has realized that intelligently downloading a reduced amount of label data that is minimally required to properly label the map would thus preserve over-the-air bandwidth and onboard processing resources of the device, without unduly sacrificing the usefulness of the map.

This new technology thus solves the foregoing technical problems by providing a method, computer program product, and wireless communications device that dynamically download label data based on the size of label data (or the label data density) for a given area of interest. In particular implementations, the label data is downloaded based on a label prioritization scheme that takes into account the current position of the device and optionally also the device's direction of movement.

Thus, an aspect of the present technology is a method of dynamically downloading map labels to a wireless communications device. The method includes steps of determining a size of label data for an area of interest, and dynamically downloading the label data for the area of interest based on the size of the label data. In one implementation of this new technology, the label data is dynamically downloaded based on a label prioritization scheme that prioritizes which labels to download based on the user's current location and movement.

Another aspect of the present technology is a computer program product comprising code adapted to perform the steps of the foregoing method when the computer program product is loaded into memory and executed on a processor of a wireless communications device.

Yet another aspect of the present technology is a wireless communications device having a radiofrequency transceiver for requesting and receiving map data corresponding to an area of interest, the map data including label data. The wireless communications device also has a processor operatively coupled to memory for determining a size of label data for the area of interest and for instructing the radiofrequency transceiver to dynamically download label data based on the size of label data for the area of interest. The wireless communications device further includes a display for displaying map labels on a map of the area of interest, wherein the labels are displayed based on the label data that is dynamically downloaded.

The details and particulars of these aspects of the technology will now be described below, by way of example, with reference to the attached drawings.

FIG. 1 is a block diagram of an example of a communication system 100 on which the present technology can be implemented. This communication system 100 includes a wireless communications device 102 (also referred to as a mobile communications device or wireless handheld) which communicates through a wireless communications network 104. For the purposes of the present specification, the expression "wireless communications device" encompasses not only a wireless handheld, cell phone or wireless-enabled laptop but also any mobile communications device or portable communications device such as a satellite phone, wireless-enabled PDA, wireless-enabled MP3 player, or wireless-enabled portable GPS navigation unit. In other words, for the purposes of this specification, "wireless" shall be understood as encompassing not only standard cellular or microwave RF technologies, but also any other communications technique that conveys data over the air using an electromagnetic signal.

The wireless communications device 102 preferably includes a visual display 112, e.g. a liquid crystal display (LCD) screen, a keyboard 114 (or keypad), and optionally one or more auxiliary user interfaces (UI's) 116, each of which is coupled to a controller 106. The controller 106 is also coupled to radio frequency (RF) transceiver circuitry 108 and an antenna 110. Typically, controller 106 is embodied as a central processing unit (CPU) which runs operating system software in a memory device (described later with reference to FIG. 2). Controller 106 normally controls the overall operation of the wireless communications device 102, whereas signal processing operations associated with communications functions are typically performed in the RF transceiver circuitry 108. Controller 106 interfaces with the display screen 112 to display received information, stored information, user inputs, and the like. Keyboard/keypad 114, which may be a telephone-type keypad or a full QWERTY keyboard, is normally provided for entering commands and data.

The wireless communications device 102 sends communication signals to and receives communication signals from wireless network 104 over a wireless link via antenna 110. RF transceiver circuitry 108 performs functions similar to those of station 118 and Base Station Controller (BSC) 120, including, for example, modulation and demodulation, encoding and decoding, and encryption and decryption. It will be apparent to those skilled in the art that the RF transceiver circuitry 108 will be adapted to the particular wireless network or networks in which the wireless communications device is intended to operate.

The wireless communications device 102 includes a battery interface 134 for receiving one or more rechargeable batteries 132. Battery 132 provides electrical power to electrical circuitry in the device 102, and battery interface 134 provides for a mechanical and electrical connection for battery 132. Battery interface 134 is coupled to a regulator 136 which regulates power to the device. When the wireless device 102 is fully operationally, an RF transmitter of RF transceiver circuitry 108 is typically keyed or turned on only when it is sending to network, and is otherwise turned off to conserve resources. Similarly, an RF receiver of RF transceiver circuitry 108 is typically periodically turned off to conserve power until it is needed to receive signals or information (if at all) during designated time periods.

Wireless communications device 102 may optionally operate using a Subscriber Identity Module (SIM) 140 (for GSM-type devices, although the device could also operate on a CDMA network or other type of network). SIM card 140 is connected to or inserted in the wireless communications device 102 at a SIM interface 142. SIM card 140 is used to identify an end user (or subscriber) operating the wireless device 102 and to personalize the device, among other things. By inserting the SIM card 140 into the wireless communications device 102, an end user can have access to any and all of his subscribed services. SIM 140 generally includes a processor and memory for storing information. Since SIM 140 is coupled to SIM interface 142, it is coupled to controller 106 through communication lines 144. In order to identify the subscriber, SIM 140 contains some user parameters such as an International Mobile Subscriber Identity (IMSI). An advantage of using SIM 140 is that end users are not necessarily bound by any single physical wireless device. SIM 140 may store additional user information for the wireless device as well, including datebook (calendar) information and recent call information.

The wireless communications device 102 may consist of a single unit, such as a data communication device, a cellular telephone, a Global Positioning System (GPS) unit or other positioning subsystem, a multiple-function communication device with data and voice communication capabilities, a wireless-enabled personal digital assistant (PDA), or a wireless-enabled laptop computer. Alternatively, the wireless communications device 102 may be a multiple-module unit comprising a plurality of separate components, including but in no way limited to a computer or other device connected to a wireless modem. In particular, for example, in the block diagram of FIG. 1, RF circuitry 108 and antenna 110 may be implemented as a radio modem unit that may be inserted into a port on a laptop computer. In this case, the laptop computer would include display 112, keyboard 114, one or more auxiliary UIs 116, and controller 106 embodied as the computer's CPU.

The wireless communications device 102 communicates in and through a wireless communication network 104. The wireless communication network may be a cellular telecommunications network. In the example presented in FIG. 1, wireless network 104 is configured in accordance with Global Systems for Mobile communications (GSM) and General Packet Radio Service (GPRS) technologies. Although wireless communication network 104 is described herein as a GSM/GPRS-type network, any suitable network technologies may be utilized such as Code Division Multiple Access (CDMA), Wideband CDMA (WCDMA), whether 2G, 3G, or Universal Mobile Telecommunication System (UMTS) based technologies. In this example, the GSM/GPRS wireless network 104 includes a base station controller (BSC) 120 with an associated tower station 118, a Mobile Switching Center (MSC) 122, a Home Location Register (HLR) 132, a Serving General Packet Radio Service (GPRS) Support Node (SGSN) 126, and a Gateway GPRS Support Node (GGSN) 128. MSC 122 is coupled to BSC 120 and to a landline network, such as a Public Switched Telephone Network (PSTN) 124. SGSN 126 is coupled to BSC 120 and to GGSN 128, which is, in turn, coupled to a public or private data network 130 (such as the Internet). HLR 132 is coupled to MSC 122, SGSN 126 and GGSN 128.

Tower station 118 is a fixed transceiver station. Tower station 118 and BSC 120 may be referred to as transceiver equipment. The transceiver equipment provides wireless network coverage for a particular coverage area commonly referred to as a 'cell'. The transceiver equipment transmits communication signals to and receives communication signals from wireless communications devices 102 within its cell via station 118. The transceiver equipment normally performs such functions as modulation and possibly encoding and/or encryption of signals to be transmitted to the wireless communications device in accordance with particular, usually predetermined, communication protocols and parameters. The transceiver equipment similar demodulates and possibly decodes and decrypts, if necessary, any communication signals received from the wireless communications device 102 transmitting within its cell. Communication protocols and parameters may vary between different networks. For example, one network may employ a different modulation scheme and operate at different frequencies than other networks.

The wireless link shown in communication system 100 of FIG. 1 represents one or more different channels, typically different radio frequency (RF) channels, and associated protocols used between wireless network 104 and wireless communications device 102. An RF channel is a limited resource that must be conserved, typically due limits in overall bandwidth and a limited battery power of the wireless device 102. Those skilled in the art will appreciate that a wireless network in actual practice may include hundreds of cells, each served by a station 118, depending upon desired overall expanse of network coverage. All pertinent components may be connected by multiple switches and routers (not shown), controlled by multiple network controllers.

For all wireless communications devices 102 registered with a network operator, permanent data (such as the user profile associated with each device) as well as temporary data (such as the current location of the device) are stored in the HLR 132. In case of a voice call to the wireless device 102, the HLR 132 is queried to determine the current location of the device 102. A Visitor Location Register (VLR) of MSC 122 is responsible for a group of location areas and stores the data of those wireless devices that are currently in its area of responsibility. This includes parts of the permanent data that have been transmitted from HLR 132 to the VLR for faster access. However, the VLR of MSC 122 may also assign and store local data, such as temporary identifications. Optionally, the VLR of MSC 122 can be enhanced for more efficient coordination of GPRS and non-GPRS services and functionality (e.g. paging for circuit-switched calls which can be performed more efficiently via SGSN 126, and combined GPRS and non-GPRS location updates).

Serving GPRS Support Node (SGSN) 126 is at the same hierarchical level as MSC 122 and keeps track of the individual locations of wireless devices 102. SGSN 126 also performs security functions and access control. Gateway GPRS Support Node (GGSN) 128 provides internetworking with external packet-switched networks and is connected with SGSNs (such as SGSN 126) via an IP-based GPRS backbone network. SGSN 126 performs authentication and cipher setting procedures based on the same algorithms, keys, and criteria as in existing GSM. In conventional operation, cell selection may be performed autonomously by wireless device 102 or by the transceiver equipment instructing the wireless device to select a particular cell. The wireless device 102 informs wireless network 104 when it reselects another cell or group of cells, known as a routing area.

In order to access GPRS services, the wireless device 102 first makes its presence known to wireless network 104 by performing what is known as a GPRS "attach". This operation establishes a logical link between the wireless device 102 and SGSN 126 and makes the wireless device 102 available to receive, for example, pages via SGSN, notifications of incoming GPRS data, or SMS messages over GPRS. In order to send and receive GPRS data, the wireless device 102 assists in activating the packet data address that it wants to use. This operation makes the wireless device 102 known to GGSN 128; internetworking with external data networks can thereafter commence. User data may be transferred transparently between the wireless device 102 and the external data networks using, for example, encapsulation and tunnelling. Data packets are equipped with GPRS-specific protocol information and transferred between wireless device 102 and GGSN 128.

Those skilled in the art will appreciate that a wireless network may be connected to other systems, possibly including other networks, not explicitly shown in FIG. 1. A network will normally be transmitting at very least some sort of paging and system information on an ongoing basis, even if there is no actual packet data exchanged. Although the network consists of many parts, these parts all work together to result in certain behaviours at the wireless link.

Figure 2:
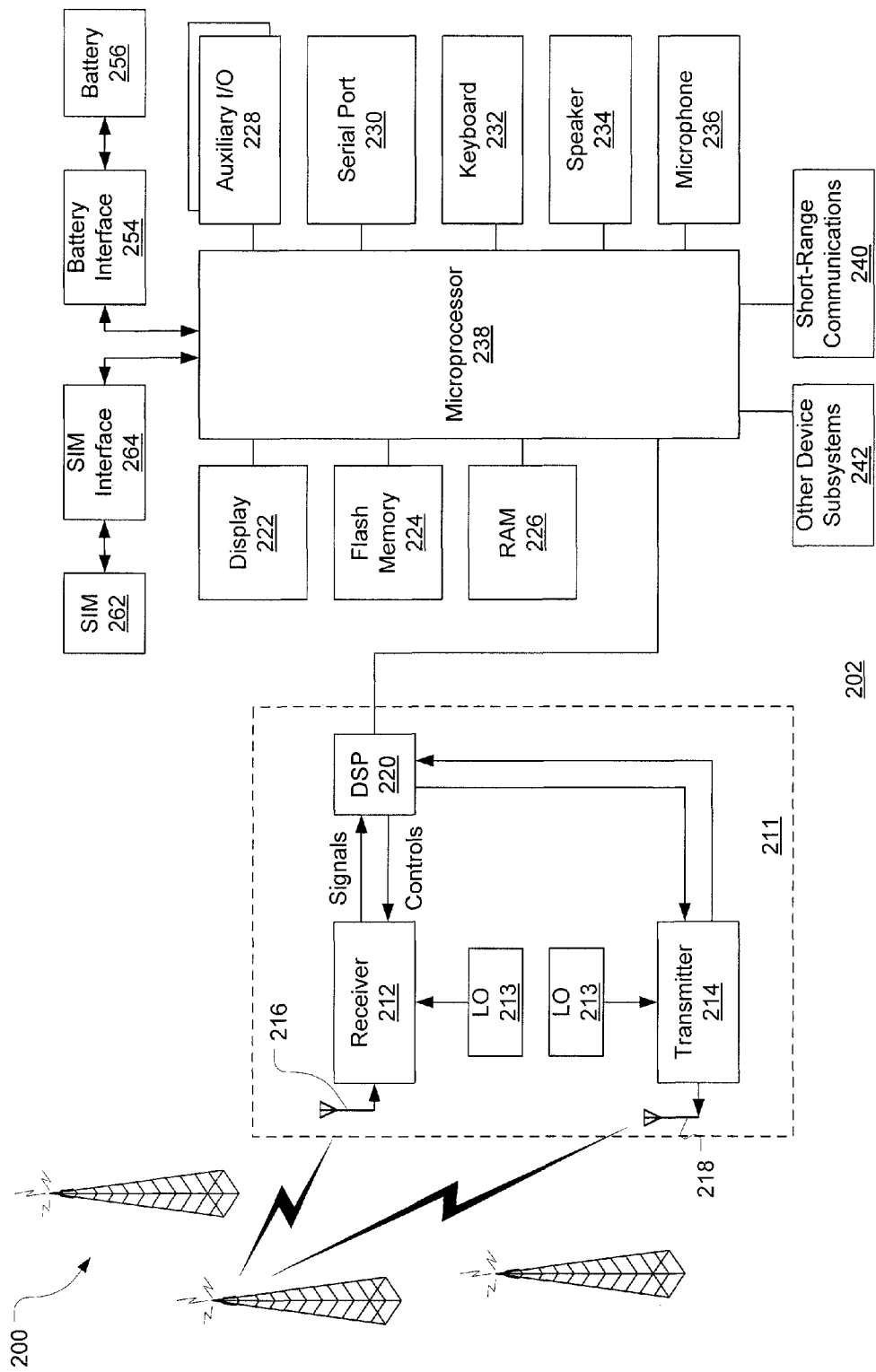
FIG. 2 is a more detailed block diagram of a wireless communications device presented solely as an example of one device on which the present technology can be implemented.

FIG. 2 is a detailed block diagram of an exemplary wireless communications device 202 on which the present technology can be implemented. The wireless device 202 is preferably a two-way communication device having at least voice and advanced data communication capabilities, including the capability to communicate with other computer systems. Depending on the functionality provided by the wireless device 202, it may be referred to as a data messaging device, a two-way pager, a cellular telephone with data message capabilities, a wireless Internet appliance, or a data communications device (with or without telephony capabilities). The wireless device 202 may communicate with any one of a plurality of fixed transceiver stations 200 within its geographic coverage area.

The wireless communications device 202 will normally incorporate a communication subsystem 211, which includes a receiver 212, a transmitter 214, and associated components, such as one or more (preferably embedded or internal) antenna elements 216 and 218, local oscillators (LO's) 213, and a processing module such as a digital signal processor (DSP) 220. Communication subsystem 211 is analogous to RF transceiver circuitry 108 and antenna 110 shown in FIG. 1. As will be apparent to those skilled in the field of communications, the particular design of communication subsystem 211 depends on the communication network in which the wireless device 202 is intended to operate.

The wireless device 202 may send and receive communication signals over the network after required network registration or activation procedures have been completed. Signals received by antenna 216 through the network are input to receiver 212, which may perform common receiver functions as signal amplification, frequency down conversion, filtering, channel selection, and the like, and, as shown in the example of FIG. 2, analog-to-digital (A/D) conversion. A/D conversion of a received signal allows more complex communication functions such as demodulation and decoding to performed in the DSP 220. In a similar manner, signals to be transmitted are processed, including modulation and encoding, for example, by DSP 220. These DSP-processed signals are input to transmitter 214 for digital-to-analog (D/A) conversion, frequency up conversion, filtering, amplification and transmission over communication network via antenna 218. DSP 220 not only processes communication signals, but also provides for receiver and transmitter control. For example, the gains applied to communication signals in receiver 212 and transmitter 214 may be adaptively controlled through automatic gain control algorithms implemented in the DSP 220.

Network access is associated with a subscriber or user of the wireless device 202, and therefore the wireless device requires a Subscriber Identity Module or SIN card 262 to be inserted in a SIM interface 264 in order to operate in the network. SIM 262 includes those features described in relation to FIG. 1. Wireless device 202 is a battery-powered device so it also includes a battery interface 254 for receiving one or more rechargeable batteries 256. Such a battery 256 provides electrical power to most if not all electrical circuitry in the device 102, and battery interface provides for a mechanical and electrical connection for it. The battery interface 254 is coupled to a regulator (not shown) which provides a regulated voltage V to all of the circuitry.

Wireless communications device 202 includes a microprocessor 238 (which is one implementation of controller 106 of FIG. 1) which controls overall operation of wireless device 202. Communication functions, including at least data and voice communications, are performed through communication subsystem 211. Microprocessor 238 also interacts with additional device subsystems such as a display 222, a flash memory 224, a random access memory (RAM) 226, auxiliary input/output (I/O) subsystems 228, a serial port 230, a keyboard 232, a speaker 234, a microphone 236, a short-range communications subsystem 240, and any other device subsystems generally designated at 242. Some of the subsystems shown in FIG. 2 perform communication-related functions, whereas other subsystems may provide "resident" or onboard functions. Notably, some subsystems, such as keyboard 232 and display 222, for example, may be used for both communication-related functions, such as entering a text message for transmission over a communication network, and device-resident functions such as a calculator or task list. Operating system software used by the microprocessor 238 is preferably stored in a persistent (non-volatile) store such as flash memory 224, which may alternatively be a read-only memory (ROM) or similar storage element (not shown). Those skilled in the art will appreciate that the operating system, specific device applications, or parts thereof, may be temporarily loaded into a volatile store such as RAM 226.

Microprocessor 238, in addition to its operating system functions, enables execution of software applications on the wireless device 202. A predetermined set of applications which control basic device operations, including at least data and voice communication applications, will normally be installed on the device 202 during its manufacture. For example, the device may be pre-loaded with a personal information manager (PIM) having the ability to organize and manage data items relating to the user's profile, such as e-mail, calendar events, voice mails, appointments, and task items. Naturally, one or more memory stores are available on the device 202 and SIM 256 to facilitate storage of PIM data items and other information.

The PIM application preferably has the ability to send and receive data items via the wireless network. PIM data items may be seamlessly integrated, synchronized, and updated via the wireless network, with the wireless device user's corresponding data items stored and/or associated with a host computer system thereby creating a mirrored host computer on the wireless device 202 with respect to such items. This is especially advantageous where the host computer system is the wireless device user's office computer system. Additional applications may also be loaded into the memory store(s) of the wireless communications device 202 through the wireless network, the auxiliary I/O subsystem 228, the serial port 230, short-range communications subsystem 240, or any other suitable subsystem 242, and installed by a user in RAM 226 or preferably a non-volatile store (not shown) for execution by the microprocessor 238. Such flexibility in application installation increases the functionality of the wireless device 202 and may provide enhanced onboard functions, communication-related functions or both. For example, secure communication applications may enable electronic commerce functions and other such financial transactions to be performed using the wireless device 202.

In a data communication mode, a received signal such as a text message, an e-mail message, or a web page download will be processed by communication subsystem 211 and input to microprocessor 238. Microprocessor 238 will preferably further process the signal for output to display 222 or alternatively to auxiliary I/O device 228. A user of the wireless device 202 may also compose data items, such as email messages, for example, using keyboard 232 in conjunction with display 222 and possibly auxiliary I/O device 228. Keyboard 232 is preferably a complete alphanumeric keyboard and/or telephone-type keypad. These composed items may be transmitted over a communication network through communication subsystem 211.

For voice communications, the overall operation of the wireless communications device 202 is substantially similar, except that the received signals would be output to speaker 234 and signals for transmission would be generated by microphone 236. Alternative voice or audio I/O subsystems, such as a voice message recording subsystem, may also be implemented on the wireless device 202. Although voice or audio signal output is preferably accomplished primarily through speaker 234, display 222 may also be used to provide an indication of the identity of the calling party, duration on a voice call, or other voice call related information, as some examples.

Serial port 230 in FIG. 2 is normally implemented in a personal digital assistant (PDA)-type communication device for which synchronization with a user's desktop computer is a desirable, albeit optional, component. Serial port 230 enables a user to set preferences through an external device or software application and extends the capabilities of wireless device 202 by providing for information or software downloads to the wireless device 202 other than through the wireless network. The alternate download path may, for example, be used to load an encryption key onto the wireless device 202 through a direct and thus reliable and trusted connection to thereby provide secure device communications.

Short-range communications subsystem 240 of FIG. 2 is an additional optional component which provides for communication between mobile station 202 and different systems or devices, which need not necessarily be similar devices. For example, subsystem 240 may include an infrared device and associated circuits and components, or a Bluetooth™ communication module to provide for communication with similarly-enabled systems and devices. Bluetooth™ is a trademark of Bluetooth SIG, Inc.

Figure 3A:
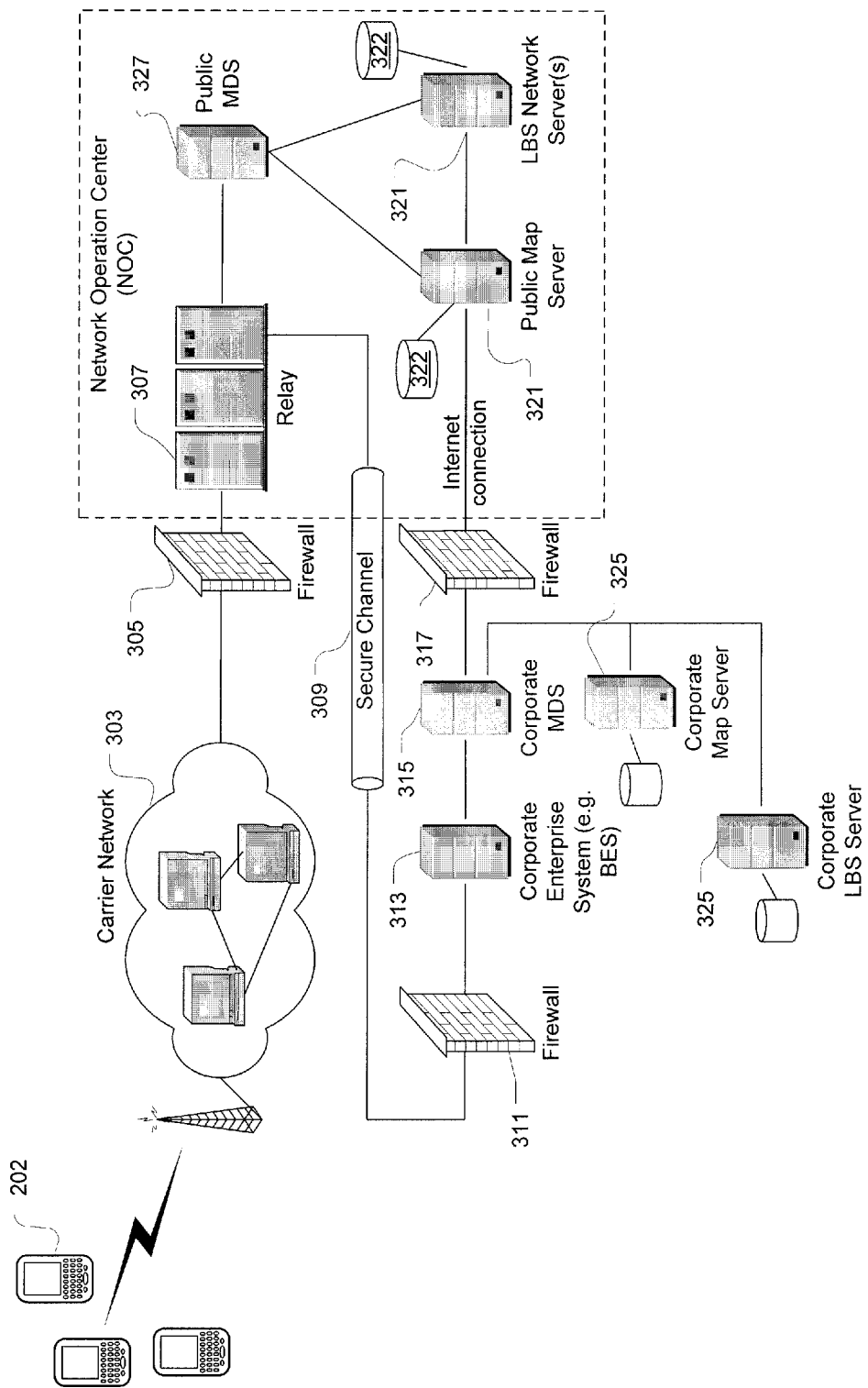
FIG. 3A is a system diagram of exemplary network components which provide mapping functionality in the wireless communications devices of FIG. 1 and FIG. 2.

FIG. 3A is a system diagram of exemplary network components which provide a preferred type of mapping functionality in the wireless communication devices of FIGS. 1 and 2. To achieve this mapping functionality, a mapping application is provided in memory of the wireless communications device for rendering visual maps on its display. Wireless communications devices 202 are connected over a mobile carrier network 303 for communication through a firewall 305 to a relay 307. A request for map data from any one of the wireless communications devices 202 is received at relay 307 and passed via a secure channel 309 through firewall 311 to a corporate enterprise server 313 and corporate mobile data system (MDS) server 315. The request is then passed via firewall 317 to a public map server and/or to a public location-based service (LBS) server 321 which provides location-based services (LBS) to handle the request. The network may include a plurality of such map servers and/or LBS servers where requests are distributed and processed through a load distributing server. The map/LBS data may be stored on this network server 321 in a network database 322, or may be stored on a separate map server and/or LBS server (not shown). Private corporate data stored on corporate map/LBS server 325 may be added to the public data via corporate MDS server 315 on the secure return path to the wireless device 202. Alternatively, where no corporate servers are provided, the request from the wireless device 202 may be passed via relay 307 to a public MDS server 327, which sends the request to the public map/LBS server 321 providing map data or other local-based service in response to the request. For greater clarity, it should be understood that the wireless devices can obtain map data from a "pure" map server offering no location-based services, from an LBS server offering location-based services in addition to map content, or from a combination of servers offering map content and LBS.

Maplet data structure can be provided that contains all of the graphic and labelled content associated with a geographic area (e.g. map features such as restaurants (point features), streets (line features) or lakes (polygon features)). Maplets are structured in Layers of Data Entries ("DEntries") identified by a "Layer ID" to enable data from different sources to be deployed to the device and meshed for proper rendering. Each DEntry is representative of one or more artefact or label (or a combination of both) and includes coordinate information (also referred to as a "bounding box" or "bounding area") to identify the area covered by the DEntry and a plurality of data points that together represent the artefact, feature or label. For example, a DEntry may be used to represent a street on a city map (or a plurality of streets), wherein the various points within the DEntry are separated into different parts representing various portions of the artefact or map feature (e.g. portions of the street) A wireless device may issue a request for the map server to download only those DEntries that are included within a specified area or bounding box representing an area of interest that can be represented by, for example, a pair of bottom left, top right coordinates. The present technology can be implemented using other data structures as well, although the use of a map data structure having an index is particularly efficient because, as will be elaborated below, the map index can be used to determine the size of label data for a given area of interest.

Figure 3B:
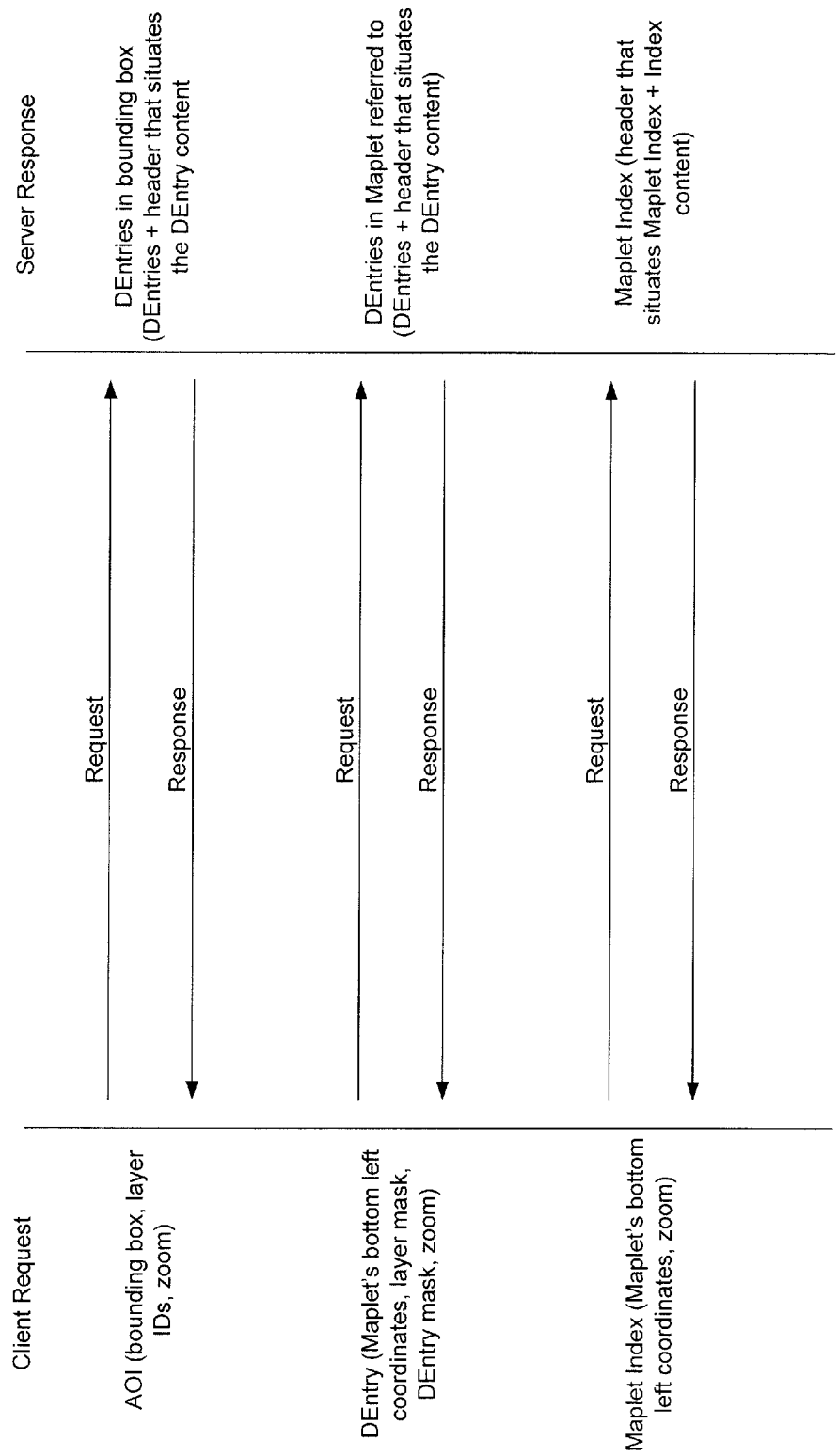
FIG. 3B illustrates an example message exchange between a wireless communications device and a map server for downloading map content to the wireless communications device based on the system of FIG. 3A.

As depicted in FIG. 3B, the wireless communications device issues one or more AOI (Area of Interest) requests, DEntry or data requests and Maplet Index requests to the map server for selective downloading of map data based on user context. Thus, rather than transmitting the entire map data for an area in reply to each request from the device (which burdens the wireless link), local caching may be used in conjunction with context filtering of map data on the server. For example, if a user's wireless device is GPS-enabled and the user is traveling in an automobile at 120 km/h along a freeway then context filtering can by employed to prevent downloading of map data relating to passing side streets. Or, if the user is traveling in an airplane at 30,000 feet, then context filtering can be employed to prevent downloading of map data for any streets whatsoever. Also, a user's context can be defined, for example, in terms of occupation, e.g. a user whose occupation is a transport truck driver can employ context filtering to prevent downloading of map data for side streets on which the user's truck is incapable of traveling, or a user whose occupation is to replenish supplied of soft drink dispensing machines can employ context filtering to download public map data showing the user's geographical area of responsibility with irrelevant features such as lakes and parks filtered out and private map data containing the location of soft drink dispensing machines superimposed on the public map data.

The Maplet Index request results in a Maplet Index (i.e. only a portion of the Maplet that provides a table of contents of the map data available within the Maplet rather than the entire Maplet) being downloaded from the map server to the device, thereby conserving over-the-air (OTA) bandwidth and device memory caching requirements. The Maplet Index conforms to the same data structure as a Maplet, but omits the data points. Consequently, the Maplet Index is small (e.g. 300-400 bytes) relative to the size of a fully populated Maplet or a conventional bit map, and includes DEntry bounding boxes and attributes (size, complexity, etc.) for all artefacts within the Maplet. As the field of view changes (e.g. for a location-aware device that displays a map while moving), the device (client) software assesses whether or not it needs to download additional data from the server. Thus, if the size attribute or complexity attribute of an artefact that has started to move into the field of view of the device (but is not yet being displayed) is not relevant to the viewer's current context, then the device can choose not to display that portion of the artifact. On the other hand, if the portion of the artefact is appropriate for display, then the device accesses its cache to determine whether the DEntries associated with that portion of the artefact have already been downloaded, in which case the cached content is displayed. Otherwise, the device issues a request for the map server to download all the of the DEntries associated with the artifact portion.

By organizing the Maplet data structure in Layers, it is possible to seamlessly combine and display information obtained from public and private databases. For example, it is possible for the device to display an office building at a certain address on a street (e.g. a $1^{st}$ z-order attribute from public database), adjacent a river (e.g. a $2^{nd}$ z-order attribute from public database), with a superimposed floor plane of the building to show individual offices (e.g. $11^{th}$ z-order attribute from a private database, accessible through a firewall).

Referring back to FIG. 3A, within the network having map server(s) and/or LBS server(s) 321 and database(s) 322 accessible to it, all of the map data for the entire world is divided and stored as a grid according to various levels of resolution (zoom), as set forth below in Table A. Thus, a single A-level Maplet represents a 0.05×0.05 degree grid area; a single B-level Maplet represents a 0.5×0.5 degree grid area; a single C-level Maplet represents a 5×5 degree grid area; a single D-level Maplet represents a 50×50 degree grid area; and a single E level Maplet represents the entire world in a single Maplet. It is understood that Table A is only an example of a particular Maplet grid division; different grid divisions having finer or coarser granularity may, of course, be substituted. A Maplet includes a set of layers, with each layer containing a set of DEntries, and each DEntry containing a set of data points.

TABLE A

| Level | Grid (degrees) | # of Maplets to cover the World | # of Maplets to cover North America | # of Maplets to cover Europe |
|---|---|---|---|---|
| A | 0.05 × 0.05 | 25,920,000 | 356,000 | 100,000 |
| B | 0.5 × 0.5 | 259,200 | 6,500 | 1000 |
| C | 5 × 5 | 2,592 | 96 | 10 |
| D | 50 × 50 | 32 | 5 | 5 |
| E | World | 1 | 1 | 1 |

As mentioned above, three specific types of requests may be generated by a wireless communications device (i.e. the client)—AOI requests, DEntry requests and Maplet Index requests. The requests may be generated separately or in various combinations, as discussed in greater detail below. An AOI (area of interest) request calls for all DEntries in a given area (bounding box) for a predetermined or selected set of z-order Layers. The AOI request is usually generated when the device moves to a new area so as to fetch DEntries for display before the device client knows what is available in the Maplet. The Maplet Index has the exact same structure as a Maplet but does not contain complete DEntries (i.e. the data Points actually representing artifacts and labels are omitted). Thus, a Maplet Index defines what Layers and DEntries are available for a given Maplet. A data request, or DEntry request, is a mechanism to bundle together all of the required Dentries for a given Maplet.

Typically, AOI and Maplet Index requests are paired together in the same message, although they need not be, while DEntry requests are generated most often. For example, when a wireless device moves into an area for which no information has been stored on the device client, the Maplet Index request returns one or more Maplet Indexes for the AOI that indicates what data the client can specifically request from the server 321, while the AOI request returns any DEntries within the area of interest for the specified Layers (if they exist). In the example requests shown on FIG. 3B, the desired Maplet is identified within a DEntry request by specifying the bottom-left Maplet coordinate. In addition, the DEntry request may include a layer mask so that unwanted Layers are not downloaded, a DEntry mask so that unwanted data Points are not downloaded, and zoom values to specify a zoom level for the requested DEntry. Once the device client has received the requested Maplet Index, the client typically then issues multiple DEntry requests to ask for specific DEntries (since the client knows all of the specific DEntries that are available based on the Maplet Index).

In this particular implementation, a collection of 20×20 A-level Maplets (representing a 1×1 degree square) is compiled into a Maplet Block File (.mbl). An .mbl file contains a header which specifies the offset and length of each Maplet in the .mbl file. The same 20×20 collection of Maplet index data is compiled into a Maplet Index file (.mbx). The .mbl and .mbx file structures are set forth in Tables B and C, respectively.

TABLE B

| Address Offset | Offset | Length |
|---|---|---|
| 0x000 | Maplet #0 Offset (4 bytes) | Maplet #0 Length (4 bytes) |
| 0x008 | Maplet #1 Offset | Maplet #1 Length |
| 0x010 | Maplet #2 Offset | Maplet #2 Length |
| ... | ... | ... |
| 0xC78 | Maplet #399 Offset | Maplet #399 Length |
| 0xC80 | | Beginning of Maplet #0 |
| 0xC80 + Size of Maplet #0 | | Beginning of Maplet #1 |
| 0xC80 + Size of Maplet #0 + #1 | | Beginning of Maplet #2 |
| ... | | ... |
| 0xC80 + Σ of Size of Maplets (#0:#398) | | Beginning of Maplet #399 |

In Table B, the offset of Maplet #0 is 0x0000_0000 since, in this particular example, the data structure is based on the assumption that the base address for the actual Maplet data is 0x0000_0C80. Therefore the absolute address for Maplet #0 data is: Maplet #0 Address=Base Address (0x0000_0C80)+Maplet #0 Offset (0x0000_0000), and additional Maplet addresses are calculated as: Maplet #(n+1) Offset=Maplet #(n) Offset+Maplet #(n) Length. If a Maplet has no data or does not exist, the length parameter is set to zero (0x0000_0000).

TABLE C

| Address Offset | Offset (4 bytes) | Length (4 bytes) |
|---|---|---|
| 0x000 | Maplet Index #0 Offset | Maplet Index #0 Length |
| 0x008 | Maplet Index #1 Offset | Maplet Index #1 Length |
| 0x010 | Maplet Index #2 Offset | Maplet Index #2 Length |
| ... | ... | ... |
| 0xC78 | Maplet Index #399 Offset | Maplet Index #399 Length |
| 0xC80 | | Beginning of Maplet Index #0 |
| 0xC80 + Size of Maplet Index #0 | | Beginning of Maplet Index #1 |
| 0xC80 + Size of Maplet Index #0 + #1 | | Beginning of Maplet Index #2 |
| ... | | ... |
| 0xC80 + Σ of Size of Maplet Indices (#0:#399) | | Beginning of Maplet Index #399 |

In Table C, the offset of Maplet Index #0 is 0x0000_0000 since, according to an exemplary embodiment the data structure is based on the assumption that the base address for the actual Maplet index data is 0x0000_0C80. Therefore, the absolute address for Maplet Index #0 data is: Maplet Index #0 Address=Base Address (0x0000_0C80)+Maplet Index #0 Offset (0x0000_0000), and additional Maplet index addresses are calculated as: Maplet Index #(n+1) Offset=Maplet Index #(n) Offset+Maplet Index #(n) Length. If a Maplet Index has no data or does not exist, the length parameter is set to zero (0x0000_0000).

Figure 3C:
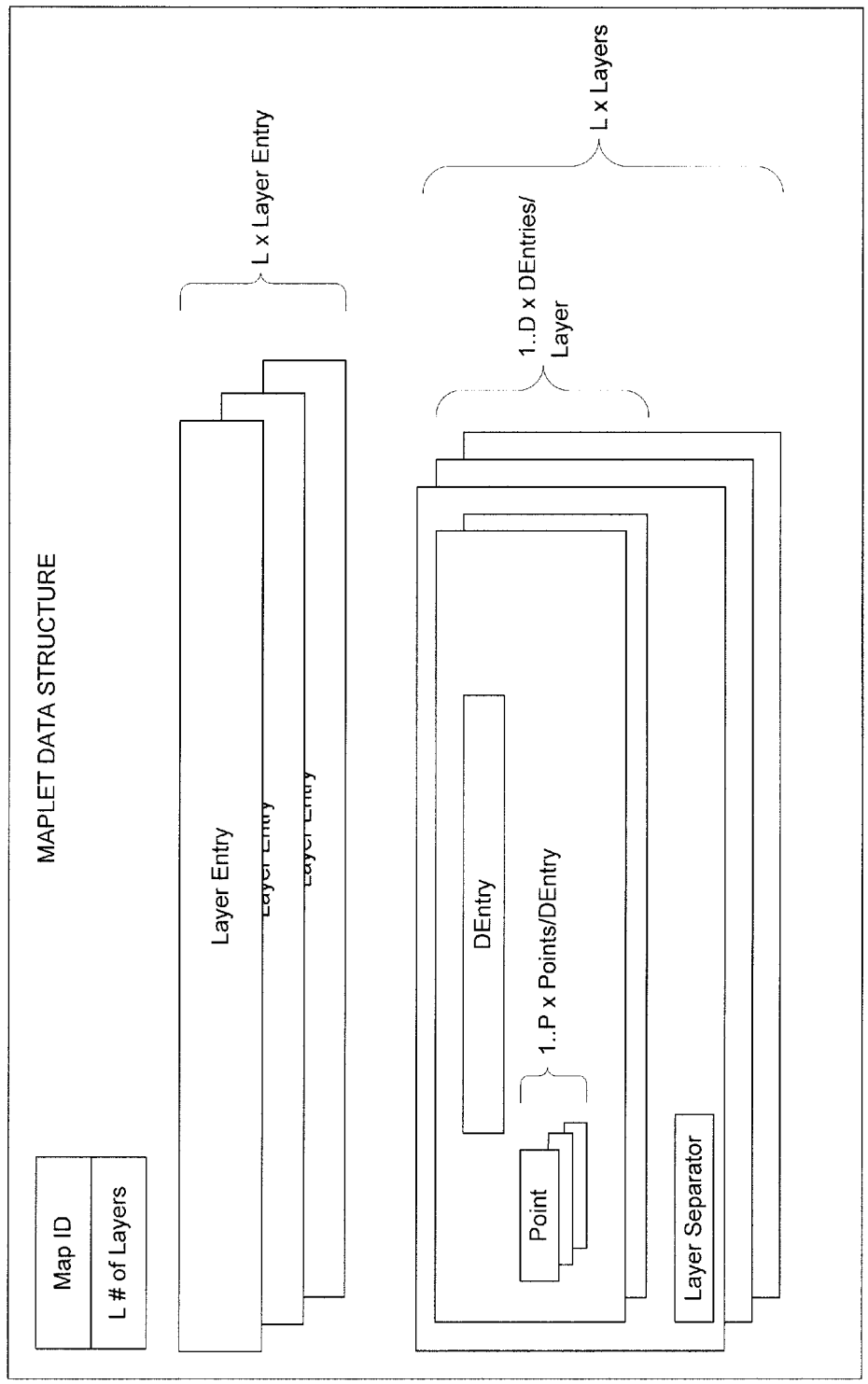
FIG. 3C is a diagram showing a preferred Maplet data structure as one example of a data structure that can be used for the present technology.

FIG. 3C and Table D (below), in combination, illustrate, by way of example only, a basic Maplet data structure. Generally, as noted above, the Maplet data structure can be said to include a Maplet Index (i.e. an index of the DEntries, each of which is representative of either an artifact or a label or both) together with data Points for each DEntry that actually form such artifacts and labels. In this example, each Maplet includes a Map ID (e.g. 0xA1B1C1D1), the # of Layers in the Maplet, and a Layer Entry for each Layer. The Map ID identifies the data as a valid Maplet, and according to one alternative, may also be used to identify a version number for the data. The # of Layers is an integer which indicates the number of Layers (and therefore Layer Entries) in the Maplet. Each Layer Entry defines rendering attributes and is followed by a list of DEntries for each Layer. Another optional field (not shown) can be used to explicitly specify the number of DEntries in each layer thereby providing a count of DEntries per layer. The above forms a Maplet Index. For a complete Maplet, each DEntry contains a set of data Points (referred to herein as oPoints) or Labels). It will be noted that Layers can have multiple DEntries and the complete list of DEntries and Points are grouped by Layer and separated by a Layer Separator (e.g. hex value 0xEEEEEEEE). In this example, each Layer Entry is 20 bytes long, and a DEntry is 12 bytes long. However, the number of Layers, number of DEntries per Layer and the number of Points per DEntry depends on the map data and is generally variable. This Maplet index provides a convenient and expedient way of determining the number, content and size of DEntries (both artefacts and labels) in the corresponding Maplet. For any given AOI, more than one Maplet index may be used to determine which labels are available for that AOI (because the AOI may span more than one Maplet).

Table D provides a high "byte-level" description of a Maplet for this example.

TABLE D

| Data | | Quantity | Total # of Bytes |
|---|---|---|---|
| Map ID | | 1 | 4 bytes |
| # of Layers | | 1 | 4 bytes |
| Layer Entries | | # of Layers | 20 bytes × (# of Layers) |
| DEntry of a Layer | x (# of DEntries in a Layer) | # of Layers | 12 bytes × (Σ of the # of DEntries in each Layer) + |
| Points for DEntry of a Layer | | | 4 bytes × (Σ of the # of Points in each DEntry in each Layer) + |
| Layer Separator | | | 4 bytes × (# of Layers) |

Figure 4:
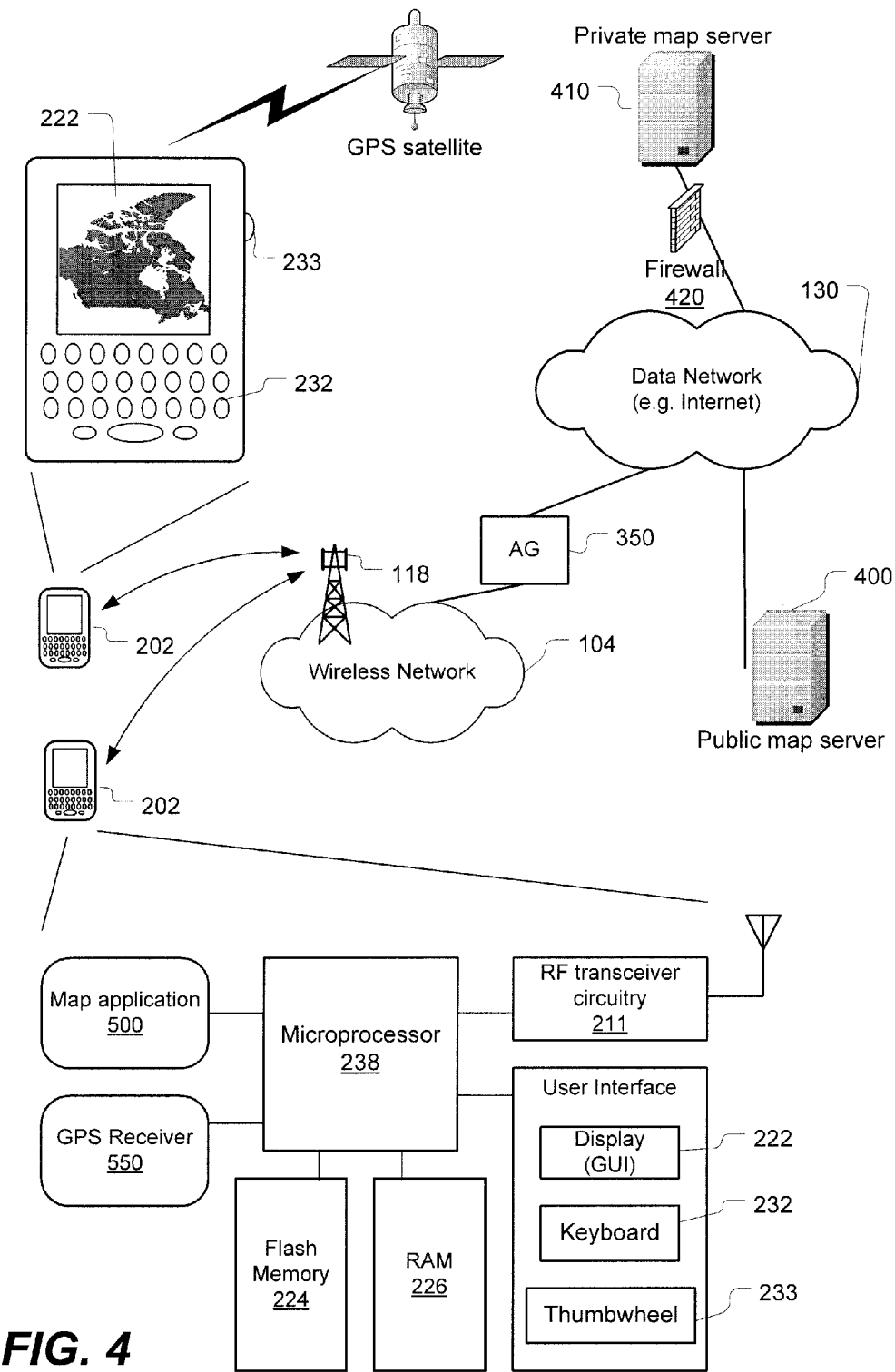
FIG. 4 is a schematic depiction of another example of a wireless network having an applications gateway for optimizing the downloading of map data from map servers to wireless communications devices.

By way of a further example, the wireless network 200 depicted in FIG. 4 can include an applications gateway (AG) 350 for optimizing data flow for onboard applications such as a mapping application 500 stored in memory (e.g. stored in a flash memory 224) and executable by the microprocessor 238 of the wireless device 202.

As shown in FIG. 4, the wireless network 104 hosts a plurality of handheld wireless communications devices 202 (such as the BlackBerry® by Research in Motion Limited) having voice and data capabilities (for both e-mail and Web browsing) as well as a full QWERTY keyboard. These wireless communications devices 202 can access Web-based map data on public map servers 400 hosted on the Internet or other data network 130 via the applications gateway (AG) 350 which mediates and optimizes data flow between the wireless network 104 and the data network by performing various encodings, mappings, compressions and optimizations on the data. The wireless communications device 202 can thus dynamically download label data by using the technology described herein. In accordance with implementations of the presently disclosed technology, the wireless communications device 202 includes a radiofrequency transceiver (e.g. the RF transceiver circuitry 211 shown in FIG. 2) for requesting and receiving map data corresponding to an area of interest, the map data including label data. The wireless communications device 202 also includes a processor (e.g. microprocessor 238 shown in FIG. 2) operatively coupled to memory (e.g. Flash Memory 224 and RAM 226 shown in FIG. 2) for determining a size of label data for the area of interest and for instructing the radiofrequency transceiver 211 to dynamically download label data based on the size of label data for the area of interest. The wireless communications device 202 further includes a display 222 for displaying map labels on a map of the area of interest, wherein the labels are displayed based on the label data that is dynamically downloaded.

The wireless device can optionally include a Global Positioning System (GPS) chipset (e.g. GPS receiver 550 shown in FIG. 4 or other positioning subsystem) for determining a current location of the device 202. Although the present disclosure refers to expressly to the "Global Positioning System", it should be understood that this term and its abbreviation "GPS" are being used expansively to include any satellite-based navigation-signal broadcast system, and would therefore include other systems used around the world including the Beidou (COMPASS) system being developed by China, the multi-national Galileo system being developed by the European Union, in collaboration with China, Israel, India, Morocco, Saudi Arabia and South Korea, Russia's GLONASS system, India's proposed Regional Navigational Satellite System (IRNSS), and Japan's proposed QZSS regional system.

In order to dynamically download label data in accordance with main implementations of the presently disclosed technology, the wireless communications device need not include a Global Positioning System (GPS) receiver ("GPS chip") 550 or any other sort of positioning subsystem. In other words, label data can be dynamically downloaded based on label size or label priorities without reference to the device's current position, its velocity or its direction of movement. Thus, for any arbitrary area of interest for which a labelled map is requested, the labels can be downloaded based on label density and, in particular implementations, based on a label prioritization scheme that downloads higher-priority labels before lower-priority labels. However, the inclusion of a GPS chipset receiver in the wireless device enables further functionalities related to the present technology, such as (i) the ability to download map and label data for an area of interest surrounding the current location of the device and (ii) the ability to readily determine the velocity of the device, which, in turn, can be used to dynamically control or adjust the amount of label data being downloaded. Although GPS is the best way presently known for obtaining a current position fix and a velocity reading for a wireless device, a different type of positioning subsystem can be used, e.g. a radiolocation subsystem that determines its current location using radiolocation techniques, as will be elaborated below. In the main implementation, though, the GPS chipset 550 receives and processes signals from GPS satellites to generate latitude and longitude coordinates, thus making the device "location aware". In lieu of, or in addition to, GPS coordinates, the location of the device can be determined using triangulation of signals from in-range base towers, such as used for Wireless E911. Wireless Enhanced 911 services enable a cell phone or other wireless device to be located geographically using radiolocation techniques such as (i) angle of arrival (AOA) which entails locating the caller at the point where signals from two towers intersect; (ii) time difference of arrival (TDOA), which uses multilateration like GPS, except that the networks determine the time difference and therefore the distance from each tower; and (iii) location signature, which uses "fingerprinting" to store and recall patterns (such as multipath) which mobile phone signals exhibit at different locations in each cell.

In operation, a user of the wireless communications device 202 uses an input device such as keyboard 232 and/or thumbwheel/trackball 233 (or, still alternatively, a touch-screen or voice-recognition input that is responsive to voice commands) to cause the microprocessor 238 to launch (open) the map application 500 stored in the memory 224. Alternatively, the map application can be launched indirectly by another application, such as a location-based services (LBS) application. Using the keyboard 232 and thumbwheel/trackball 233, the user can specify a map location on the map application 500. In response to this request/command, the microprocessor 238 instructs the RF transceiver circuitry 211 to transmit the request over the air through the wireless network 104. The request is processed by the AG 350 and forwarded into the data network (e.g. Internet) using standard packet-forwarding protocols to one or more of the public and/or private map servers 400, 410. (Accessing a private map server 410 behind a corporate firewall 420 was described above with reference to FIG. 3A.) Map data downloaded from these one or more map servers 400, 410 is then forwarded in data packets through the data network and encoded/transformed/optimized by the AG 350 for wireless transmission through the wireless network 104 to the wireless communications device 202 that originally sent the request.

The downloaded map data (including any available label data) can be cached locally in RAM 226, and displayed on the display 222 or graphical user interface (GUI) of the device. If a further request is made by the user (or if the user wants a change in the field of view by zooming or panning), the device will check whether the required data can be obtained from the local cache (RAM 226). If not, the device issues a new request to the one or more map servers 400, 410 in the same manner as described above.

As described earlier, map data can optionally be downloaded first as a Maplet Index enabling the user to then choose which DEntries listed in the Index to download in full (or alternatively which specific layers to download). Furthermore, as described earlier, the map application can include user-configurable context filtering that enables the user to filter out unwanted map features or artifacts by not downloading specific DEntries corresponding to those unwanted map features or artifacts. As will be elaborated below, the hierarchical nature of this Maplet data structure facilitates implementation of this technology by allowing the device to efficiently assess the size of label data and then to download specific layers of label data or even specific labels depending on the label data density (size of label data) for a given area of interest (AOI).

Figure 5:
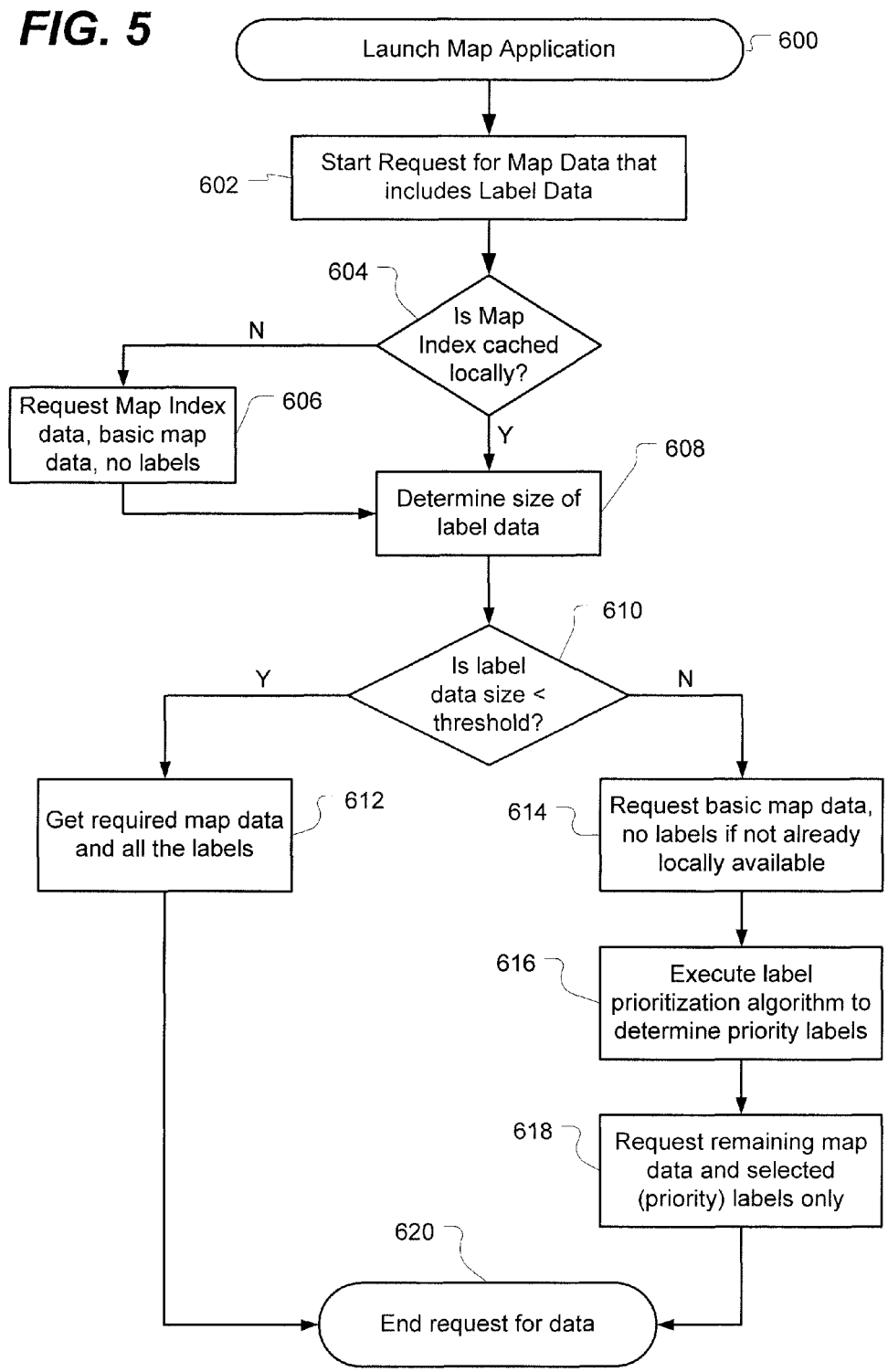
FIG. 5 is a flowchart presenting main steps of a method of dynamically downloading labels in accordance with implementations of the present technology.

Operation of the dynamic label download technology introduced above will now be further described with reference to the method steps depicted in the flowchart of FIG. 5. As depicted in FIG. 5, this novel method of dynamically downloading label data to a wireless communications device includes an initial step 600 of launching a map application. As noted above, this can be done directly by the user of the device, or indirectly by means of another application, e.g. an LBS application that causes the map application to open.

At step 602, a map request is detected, e.g. after being initiated by a user. The map request can be initiated by the user requesting a map in any number of known ways, such as entering location information, clicking on a hyperlinked URL, or activating a navigation application. Before the device makes the request for map data to the map server, the device first determines whether a map index for the AOI (such as, for example, the Maplet data index described above) is available locally, i.e. already cached on the device (step 604) for the purposes of determining the label data density for the AOI. If not, before the request for map data is transmitted by the device to the map server, the device obtains the map data index (or simply the "map index"). This map index provides an index of all the map data and label data available for the AOI at that given zoom level (or magnification). Obtaining the map index can be done by retrieving or downloading the index from a map server over the air (or via a wired connection) or by obtaining some or all of the map index data, if at least some it is cached locally, from onboard device memory, or combinations thereof.

For the purposes of this specification, "map data" includes "label data". In other words, map data includes "pure" map data pertaining to map elements (i.e. geographical features such as streets, bodies of water, etc.) and also label data corresponding to the various available labels that can be rendered onscreen to label the various roadways and geographical features on the map. All of this map data (both pure map data and corresponding label data), is indexed by the map index, an example of which is depicted schematically in FIG. 6, and which will be described in greater detail below. In the specific example of a Maplet data structure (which was introduced above with respect to FIGS. 3B-3C), the "map index" would be a Maplet index having various layers and, within each layer, various DEntries representing artefacts and labels. In the specific example of Maplets, then, the "label data" would include those DEntries that pertain to specific labels (or label strings) and would exclude the other DEntries that pertain to "pure" map data, i.e. artefacts such as roadways, borders, geographical features, etc.

Thus, at step 604, a decision is made whether the map data index ("map index") is already cached locally on the device. If so, then the size of the label data is determined from the map index at step 608. If the index is not already cached on the device, then the label data needs to be downloaded. At step 606, the device issues a request for the map index (i.e. a request for the map index data). Optionally, the request for the map index can include, or be accompanied by, a request for basic map data without any labels so that downloading of basic map data for basic map features can begin without further delay. (What constitutes "basic" map features will vary depending on the zoom level, and optionally also on other factors, such as user-configured context-filtering, recent usage, etc.)

Once the map index is downloaded or otherwise obtained, then the device (at step 608) can determine the size of the label data. Determining the size of the label data for a given AOI can be done in different ways. One technique exploits the map index by using the offset of each layer (in the index). Label data size can be conveniently calculated using the offset which is stored in the map index. For a very simple illustrative example, consider a map index having five layers of labels where the offset of layer 1=0, the offset of layer 1=100, the offset of layer 2=250, the offset of layer 3=275, and the offset of layer 4=575. In this example, to calculate the size of Layer 0 simply subtract the offset of Layer 1 from the Offset of Layer 0=100−0=100. Therefore Layer 0 is 100 bytes. Layer 1 is 250−100=150 bytes, Layer 2 is 275−250=25 bytes, Layer 3 is 575−275=300 bytes and Layer 4 would be calculated by having the total size (not shown) and subtracting 575.

The offset technique is a quick way of determining how much label data there is for each layer so that a quick decision can be made as to which layers to download and which to omit. Another approach is to compute the total number of labels available for a given AOI based on the map index(es), and then to determine which of these labels is to be downloaded individually.

Irrespective of whether the map index is already cached or whether it has to be downloaded, the wireless communications device can then make a determination at step 610 as to how the size of the label data (or label data density) compares to a predetermined threshold. The predetermined threshold is simply a threshold that is determined prior to the comparison, and can itself vary as a function of device velocity or other factors, as will be elaborated below. As noted above, the predetermined threshold can be set either (i) as a maximum allowable data size for assessing which layer or layers are to be downloaded or (ii) as a maximum allowable number of individual labels for assessing which individual label or labels are to be downloaded.

If the size of the label data is less than the predetermined threshold, operations proceed to step 612 at which point the device obtains, e.g. wirelessly downloads, all the labels along with the remaining map data (assuming that the basic map data if any previously downloaded represented only a subset of the total available map data for the AOI) Alternatively, if the size of the label data is greater than the predetermined threshold (as determined at decision step 610), then operations proceed to step 614 at which point the device optionally requests the basic map data without any labels (assuming that these labels are not already locally cached). At subsequent step 616, the device executes a label prioritization algorithm to determine the priority of the available labels. The label prioritization algorithm implements a label prioritization scheme that prioritizes labels from highest priority to lowest priority. In one particular group of implementations, the label prioritization scheme prioritizes labels based on, from highest priority to lowest priority:

(1) Label of the path on which the device is currently located (which can be determined using GPS and roadway navigation techniques);

(2) Labels of paths connected to and ahead of the path on which the device is currently located (which requires knowledge of the direction of travel of the device, again determinable using GPS); and (3) All other labels which, in turn, are prioritized in terms of street class wherein major roadways are given higher priority than secondary roadways. In other words, a label associated with a class 1 roadway (such as a highway) would be downloaded prior to a label associated with a class 2 roadway (such as a secondary street). Other road class prioritization schemes can, of course, be used, especially where there are more than more than two classes of roads. User-configured context filtering and recent usage patterns (roads frequently traveled) can also be used as factors in determining priority. Thus, for example, the device could take note that the device travels to the same destination every day along a tertiary country road. The label associated with this tertiary road, by virtue of recent usage patterns, would, in this example, be given a higher than usual priority rating by the device.

At subsequent step 618, the device optionally requests the remaining map data and the selected (higher priority) labels only. Thereafter, operations cease at step 620 (as they do subsequent to step 612) but, of course, operations can resume at step 602 anytime if the map is panned, zoomed, or if a new map request is made either because the device is operating in GPS navigation mode (and the device keeps moving) or because the user enters new location information, thus requiring the provision of a new map. It is important to note that steps 614 and 618 (requesting basic map data and then requesting the remaining map data) are optional. These optional steps (614 and 618) need not be performed in the order presented in this figure or as two separate steps. These steps (614 and 618) can effectively be combined into a single step of downloading all the required map data at once (e.g. either before or after the prioritization algorithm has been run at step 616, or even in parallel therewith). In other words, neither the dynamic downloading of labels nor the label prioritization algorithm depends on the downloading of pure map data, i.e. data pertaining to artefacts.

As noted above, this algorithm can be modified to further take into account the velocity of the device (as preferably (but not necessarily) determined using GPS). If the velocity of the device is high, e.g. traveling at 100 km/h, then the total data being downloaded for the AOI as the map view continually refreshes may be excessive if extra layers or map features are to be retrieved in additional to the normally retrieved layers. Thus, the velocity may be used to modulate or vary the actual amount of data being downloaded (how many data points) and/or the layers that are to be retrieved.

The dynamic label download can be modulated not only by the measured velocity, but also by other factors such as remaining battery power or current bandwidth usage. If the device detects that battery power in waning, the device may throttle downwardly the amount of label data to be downloaded for any given map, in order to conserve battery power. Likewise, if the wireless link is being heavily used for other functions in parallel with the downloading of a map, such as, for example, receiving a software update over the air, then the device may automatically reduce the amount of label data to be downloaded. Other scenarios can also be envisaged where the download of labels can be modulated. In all of these cases, e.g. high velocity, low battery, high wireless traffic, the device can dynamically modulate its downloading of label data. This can be done by modulating the predetermined threshold so that less label data is downloaded. In other words, the device can automatically lower its threshold to receive fewer labels than normal, e.g. by lowering the maximum allowable label data size that can be downloaded or by lowering the maximum allowable number of labels that can be downloaded.

The foregoing method steps can be implemented as coded instructions in a computer program product. In other words, the computer program product is a computer-readable medium upon which software code is recorded to perform the foregoing steps when the computer program product is loaded into memory and executed on the microprocessor of the wireless communications device.

Figure 6:
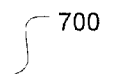
FIG. 6 is a simplified example of a map index for use in determining whether the label data size exceeds a predetermined threshold in accordance with certain implementations of the present technology.
Figure 7:
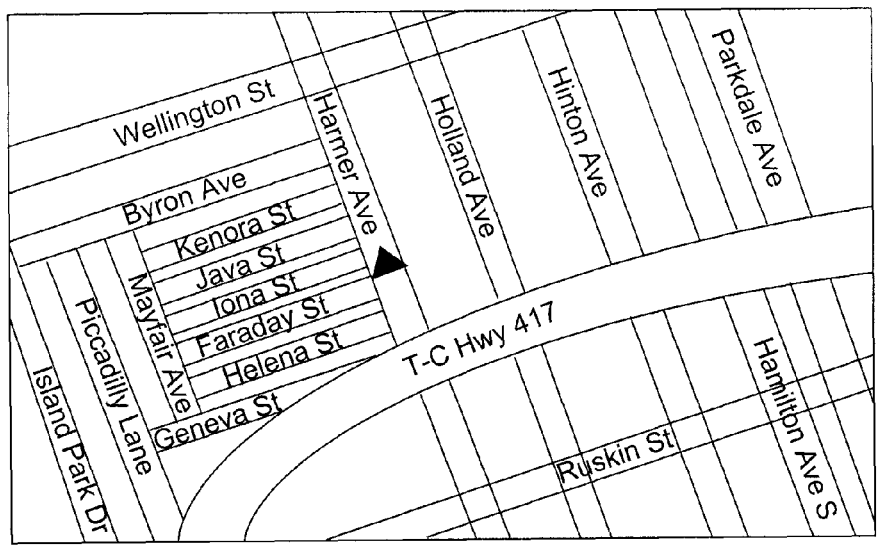
FIG. 7 is a schematic depiction of a street map showing a large number of street labels that is rendered by conventionally downloading all available label data for a given area of interest and zoom level.
Figure 8:
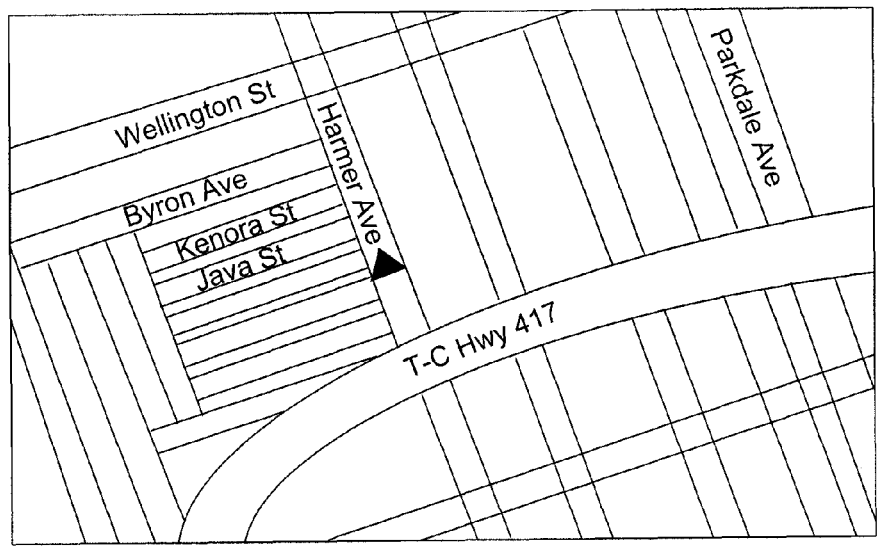
FIG. 8 is a schematic depiction of a street map showing a reduced number of street labels that is rendered by first applying dynamic label downloading in accordance with implementations of the present invention.

Implementations of the present technology will now be further described with regard to various specific examples presented in FIGS. 6-8.

FIG. 6 shows an example of an intentionally simplified map index showing a variety of layers relating to roadways (although the map index would typically also include layers for other geographical features too, such as parks, landmarks, bodies of water, railroads, and the labels associated with these various geographical features.) For the sake of illustration only, this map index shows roadways such as highways, main streets and side streets as well the corresponding labels associated with each of these layers. For example, the layer entitled "Major Highways A" represents a layer of major highways that is downloaded at a zoom level between 0 and 3. If the map request is for a zoom level between 4 and 8, then layer B ("Major Highways B") would be downloaded instead. Thus, for any given request, depending on the zoom level, the map index provides different layers that are available for downloading and rendering onscreen. Conventionally, for an AOI request at a zoom level of, say, 3, then three label layers would be downloaded, namely Major Highway Labels A, Main Street Labels A, and Side Street Labels A (along with the pure map data layers for Major Highways A, Main Streets A and Side Streets A). This could represent a large number of labels, which is time-consuming to download. Not all of these labels would necessarily fit properly onscreen anyway, so many labels might be downloaded but not rendered, which is, of course, highly inefficient. Similarly, if the user zooms out to, say, zoom level 4, then Major Highways B and Main Streets B would be downloaded as map data along with Major Highway Labels B and Main Street Labels B. (At this lower zoom level, the side streets are no longer visible, so this layer is not downloaded.) Nonetheless, downloading all of this label data is potentially very inefficient and bandwidth-intensive.

Using implementations of the present technology, however, labels are downloaded dynamically to correct this inefficiency. Labels can be dynamically downloaded based on the label data size or "label density" for the given AOI and zoom level. Thus, at zoom level 3, the total label data (e.g. using the offset values) or the total number of individual labels is determined for Highway Labels A, Main Street Labels A and Side Street Labels A to give a "label data size" value which is then compared to the relevant predetermined threshold (data size or total number of labels) to determine whether to download only high-priority labels (or high-priority label layers) or whether to download all the available labels (or all of the label layers).

With reference still to FIG. 6, it should be understood that this is a simplified example of one form of map index. Indeed, as noted above, the map index could have a different number of layers for each category of map feature (and, of course, as noted above, the other main types of map features are intentionally omitted, such as landmarks, parks, bodies of water, cities, borders, railroads, etc.) It should also be borne in mind that another (exemplary) map index would be the Maplet index introduced above with reference to FIGS. 3B-3C.

Furthermore, this map index is shown with both A and B layers that are applicable for different ranges of zoom levels simply to illustrate that the map data and label data in the map index can vary as a function of zoom level. However, the map index could simply present a single type of layer (either A or B but not both). In other words, the map server may simply retrieve the appropriate categories of layers (A or B but not both) based on the specified zoom level rather than retrieving both categories of layers and leaving the ultimate selection of the appropriate layer to the device.

In a more general embodiment, therefore, a user makes a request for new map data by somehow defining a bounding box or area of interest (AOI) for a given zoom level. (The AOI can be defined e.g. by specifying an address, city, geographical entity, point of interest (POI), or coordinates of longitude and latitude, etc., or by clicking on a hyperlinked URL to a web-based map server provided by another party, or by automatically using the current location, e.g. when navigating by GPS). In response to the map request, a map index is retrieved by the map server. The map index (or "map data index") comprises an index of label data for available map labels. In other words, the map index provides an index to all the available map data for rendering map features as well as all of the available labels for labelling these features. Accordingly, it should be understood that the index of label data can be integrated within a single map index or it can be separate index. In any event, the label data size is computed and compared to a threshold. This computation and comparison is preferably done by the wireless device itself, but it could alternatively be done by the map server or by any connected computing device or server. Indeed, it is possible for the size determination to be done on one computing device with the comparison being performed on a separate device. For example, the map server (or a server connected to it in the network) could do the size computation and the wireless device could then do the comparison (based on its own local parameters, such as velocity, battery power, recent usage patterns, user settings, etc.)

Dynamic downloading of labels can be done layer-by-layer or label-by-label. In one example, given the special hierarchical nature of the Maplet data structure described previously, it is possible to download individual map data entries from a given map data layer rather than having to download the entire layer of entries. This provides great flexibility in modulating the level of detail for a given map. As noted above, specific implementations of this technology can preferentially download specific labels from a given label layer based on a layer-specific priority scheme. In other words, within any given layer of labels, the device can prioritize which of the labels in that given layer are most important for the user. In particular, this layer-specific prioritization can take into account the context in which the device is operating, recent usage patterns and user preferences and settings.

FIG. 7 and FIG. 8 together illustrate how the present technology can be used to efficiently download the most relevant labels by first determining whether the label data size is excessive, and if so, which labels are to be downloaded first. Determining which labels are to be downloaded first can be based on the label prioritization scheme (or label prioritization algorithm) introduced above (or alternatively on other label prioritization schemes that can be either preset by the manufacturer or customized by the end-user). In FIG. 7 is shown a street map with a relatively large number of labels. As noted above, downloading all of the label data for rendering these labels can be inefficient (both in terms of OTA bandwidth and onboard processing), particularly where not all of the labels can be fitted onto the map and/or when the device is moving so rapidly that the device cannot download and render the labels fast enough. The present technology solves these problems by dynamically downloading the labels by first assessing whether the label data is too large to be easily handled. As noted elsewhere in this disclosure, the device can take into account its velocity in making this assessment, e.g. by adjusting the predetermined size threshold. If the size of the label data is too large, then the label prioritization algorithm enables the device to determined an order or priority for downloading available labels. In this specific example, then, assuming the device determines that the label data for all the labels available in for the map of FIG. 7 is too large, then the device would apply the label prioritization scheme. The device determines (or already knows) its current position (on Harmer Ave) and determines (or already knows) its direction of travel (northwest), as per the black triangular icon). Accordingly, Harmer Ave is the highest priority label for downloading. Subsequently, the label prioritization scheme gives next highest priority to labels associated with streets that are connected to and ahead of the path on which the device is situated. In this particular example, these streets would be Java St, Kenora St and Byron St in that order because these represent the next cross streets in the device's direction of travel (i.e. cross streets from nearest to farthest). As a next level of priority, again based on the label prioritization scheme, the device looks for class 1 roadways (major highways), of which there is only one, the TransCanada Highway 417 (abbreviated as "T-C Hwy 417" on the maps). The next priority would be assigned to main streets (class 2 roadways), which would be, in this example, main thoroughfares or boulevards such as Wellington St and Parkdale Ave. In this example, the device might be configured to limit the label download to a specific set of labels classes, such as current path, upcoming cross-streets, class 1 and class 2 roadways. If this were the case, then in our example, only seven labels would be downloaded, namely Harmer Ave, Java St, Kenora St, Byron St, T-C Hwy 401, Wellington St, and Parkdale Ave. Optionally, instead of a prescribed definition of acceptable label classes, the device could use a running tally (in parallel with the label prioritization scheme) that would compute on-the-fly the cumulative number of labels that the device would wish to download. This running tally could be checked against a maximum allowable number of labels that in turn could be preset by the manufacturer or configurable by the end-user, or alternatively made to vary depending on the velocity of the device (or other factors).

FIG. 8 shows an example of a map rendered with a reduced number of labels as a result of applying the label prioritization scheme to the available label data listed in the map index. In this particular example, as noted above, only seven labels are downloaded (and then rendered) so that only the most relevant labels are presented on the display of the device, namely Harmer Ave (the road the user is traveling along) and the upcoming cross-streets (Java St, Kenora St and Byron St), which are based on knowing the direction of movement of the device (which can be determined using GPS, for example). In the particular example presented in FIG. 8, the labels T-C Hwy 417, Wellington St and Parkdale Ave are also deemed important enough to be downloaded as these represent the major highway and main streets in the AOI. As will be readily appreciate, these labels can be downloaded together (as a complete batch of high-priority labels) or sequentially based on priority level (e.g. downloading Harmer first, then downloading Java, Kenora and Byron second, then downloading T-C Hwy 417, Wellington and Parkdale third. Alternatively, the labels can be downloaded sequentially and individually, in which case each individual label would be downloaded in this order: Harmer, Java, Kenora, Byron, T-C Hwy 417, Wellington, Parkdale. Using individual sequential downloading, the label data can be downloaded one label at a time. The labels could then be rendered onscreen one at a time or in batches.

In addition to dynamic downloading of the labels, the same (or a different) label prioritization scheme can be used to prioritize the labels for dynamically rendering (i.e. dynamically displaying) the labels onscreen. In certain cases, e.g. when traveling at high velocity, even if the labels are downloaded (or already cached) the rendering time itself may negatively impact the user experience, in which case it may be useful to dynamically render the labels so that the highest priority (cached or downloaded) labels are rendered first (so that the most crucial information is conveyed to the user immediately). For example, when traveling at high velocity at a high zoom level, it may be preferable to give utmost precedence to the label associated with the street on which the user is traveling and the next upcoming cross-street. At least presenting these two labels to the user would ensure that the most rudimentary navigation information is provided in a timely manner.

Implementation of the novel technology disclosed herein can be accomplished using different map data structures. However, for better performance, a hierarchical vector-based map data structure such as the Maplet data structure described above should be utilized. This Maplet data structure is well adapted to implementing this technology because it organizes map data into layers and individually accessible DEntries. Coupled with this data structure, a communications protocol should be used that enables the requesting of both entire layers or specific entries. This provides flexibility in dynamically downloading labels to thus create a superior user experience.

This new technology has been described in terms of specific implementations and configurations (and variants thereof) which are intended to be exemplary only. The scope of the exclusive right sought by the applicant is therefore intended to be limited solely by the appended claims.

The invention claimed is:

1. A method of dynamically downloading map labels to a wireless communications device, the method comprising:
determining a size of available label data for an area of interest by obtaining a map index of available label data and calculating the size of available label data from the map index;
determining whether the size of label data for the area of interest exceeds a predetermined size threshold;
dynamically downloading all or a subset of the label data for the area of interest by:
if the size of the label data is less than the predetermined threshold, downloading the label data for the area of interest; and
if the size of the label data is greater than the predetermined threshold, downloading the subset of the label data for the area of interest.

2. The method as claimed in claim 1 wherein downloading the subset of the label data for the area of interest is performed based on a label prioritization scheme.

3. The method as claimed in claim 2 wherein the label prioritization scheme prioritizes labels according to, from highest priority to lowest priority:
(1) Label of the path on which the device is currently located;
(2) Labels of paths connected to and ahead of the path on which the device is currently located; and
(3) All other labels which, in turn, are prioritized in terms of street class wherein major roadways are given higher priority than secondary roadways.

4. The method as claimed in claim 1 further comprising dynamically displaying map labels corresponding to the downloaded label data for the area of interest, the map labels being dynamically displayed based on a label prioritization scheme.

5. The method as claimed in claim 2 wherein downloading the subset of the label data for the area of interest comprises:
determining which labels are to be downloaded based on the label prioritization scheme.

6. The method as claimed in claim 2 wherein downloading the subset of the label data for the area of interest comprises:
determining which layers of labels are to be obtained based on the label prioritization scheme wherein the label data is organized as layers of labels, each layer of labels comprising a plurality of individual labels.

7. The method as claimed in claim 1 further comprising determining a velocity of the wireless communications device using a GPS receiver to thereby enable the label data to be dynamically downloaded based on the velocity.

8. A non-transitory computer readable medium comprising code which, when loaded into memory and executed on a processor of a wireless communications device, is configured to perform acts of:
determining a size of available label data for an area of interest by obtaining a map index of available label data and calculating the size of available label data from the map index; and
determining whether the size of label data for the area of interest exceeds a predetermined size threshold;
dynamically downloading all or a subset of the label data for the area of interest by:
if the size of the label data is less than the predetermined threshold, downloading the label data for the area of interest; and
if the size of the label data is greater than the predetermined threshold, downloading the subset of the label data for the area of interest.

9. The computer readable medium as claimed in claim 8 wherein downloading the subset of the label data for the area of interest is performed based on a label prioritization scheme.

10. The computer readable medium as claimed in claim 8 wherein downloading the subset of the label data for the area of interest comprises:
   determining which labels are to be downloaded based on a label prioritization scheme.

11. The computer readable medium as claimed in claim 9 wherein the label prioritization scheme prioritizes labels according to, from highest priority to lowest priority:
   (1) Label of the path on which the device is currently located;
   (2) Labels of paths connected to and ahead of the path on which the device is currently located; and
   (3) All other labels which, in turn, are prioritized in terms of street class wherein major roadways are given higher priority than secondary roadways.

12. The computer readable medium as claimed in claim 8 wherein the code is further configured to dynamically download the label data based on a velocity of the device.

13. A wireless communications device comprising:
   a radiofrequency transceiver for requesting and receiving map data corresponding to an area of interest, the map data including label data;
   a processor operatively coupled to memory for:
      determining a size of available label data for the area of interest by obtaining a map index of available label data and calculating the size of available label data from the map index; and
      instructing the radiofrequency transceiver to dynamically download all or a subset of the label data based on the size of label data for the area of interest by:
         if the size of the label data is less than a predetermined threshold, downloading the label data for the area of interest; and
         if the size of the label data is greater than the predetermined threshold, downloading the subset of the label data for the area of interest; and
   a display for displaying map labels on a map of the area of interest, wherein the labels are displayed based on the label data that is dynamically downloaded.

14. The wireless communications device as claimed in claim 13 wherein the processor is configured to instruct the radiofrequency transceiver to dynamically download the label data based on a label prioritization scheme that prioritizes labels based on, from highest priority to lowest priority:
   (1) Label of the path on which the device is currently located;
   (2) Labels of paths connected to and ahead of the path on which the device is currently located; and
   (3) All other labels which, in turn, are prioritized in terms of street class wherein major roadways are given higher priority than secondary roadways.

15. The wireless communications device as claimed in claim 13 further comprising a GPS receiver for determining a velocity of the device and for providing the velocity to the processor to enable the processor to instruct the radiofrequency transceiver to dynamically download the label data based not only on the label size but also on the velocity.

16. The wireless communications device as claimed in claim 14 further comprising a GPS receiver for determining a velocity of the device and for providing the velocity to the processor to enable the processor to instruct the radiofrequency transceiver to dynamically download the label data based not only on the label size but also on the velocity.

17. The wireless communications device as claimed in claim 13 wherein the processor is further configured to cause the display to dynamically display the map labels corresponding to the downloaded label data for the area of interest, the map labels being dynamically displayed based on a label prioritization scheme.

18. The wireless communications device as claimed in claim 16 wherein the processor is further configured to cause the display to dynamically display the map labels corresponding to the downloaded label data for the area of interest, the map labels being dynamically displayed based on the label prioritization scheme.

19. The wireless communications device as claimed in claim 13 wherein the processor is further configured to compute the size of the label data using the offset of each layer of the map data.

20. The wireless communications device as claimed in claim 18 wherein the processor is further configured to compute the size of the label data using the offset of each layer of the map data.

* * * * *